INVENTORS
JAMES A. MITCHELL
DONALD E. WILBUR, JR.
FREDRICK W. WURTZELL

ATTORNEY

United States Patent Office 3,449,482
Patented June 10, 1969

3,449,482
METHOD FOR FORMING MOLDED RIBBED PANELS
James A. Mitchell, North Tarrytown, and Donald E. Wilbur, Jr., Hastings-on-Hudson, N.Y., and Frederick W. Wurtzell, Darien, Conn., assignors to Union Carbide Corporation, a corporation of New York
Filed Oct. 23, 1964, Ser. No. 406,012
Int. Cl. B29d 3/02
U.S. Cl. 264—108       8 Claims

ABSTRACT OF THE DISCLOSURE

Molded ribbed panels suitable for a structural use composed of fibrous articles bonded together with a bonding agent can be fabricated by orienting the fibers in the ribbed sections normal to the plane of the skin section. This orientation results in enhanced tensile strength and diminished swell characteristics in panels fabricated from these structures.

---

Figure 1:
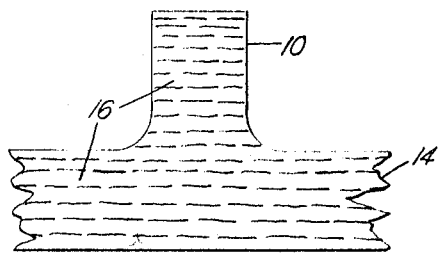

This invention relates to molded ribbed panels and improved methods of making them. More particularly, it relates to ribbed panels, suitable for structural use, composed of fibrous particles bonded together with a bonding agent.

In making molded ribbed panels, one of the chief problems encountered is low mechanical or physical strength of the rib section. If the fibrous particles are bonded to form a slab and the ribbed panel is sculptured therefrom, the orientation of the fibrous particles is essentially in parallel planes in both the skin and ribbed sections. (The term "skin section" as used herein refers to the planar surface of the panels of this invention to which parallel rib sections are integrally affixed.) When all of the fibrous particles lie in parallel planes this results in a ready shear of the ribs along these parallel orientation planes. The same undesirable structure is obtained if a mixture of fibrous particles and bonding agent, preformed into a skin section with ribs thereon, is cured between two platens one of which is itself ribbed to retain the ribbed structure of the molded article.

Another problem encountered with building panels used in the construction of walls in frame dwellings is the difficulty of installing services in the wall and supports and aligning and attaching of wires, conduits, pipes and the like are time consuming and add to the construction costs. The advantages of a construction system which would permit partial prefabrication and preinstallation of services are obvious.

It is, therefore, an object of this invention to provide molded ribbed panels of bonded fibrous particles having integrally molded rib sections which exhibit good shear, impact, and tensile strength.

It is another object of this invention to provide molded ribbed panels with sufficient mechanical strength to sustain the application of physical loads and forces encountered in residential construction so that said panels can be employed as decks, partitions, ceilings, roofs, and the like.

It is another object to provide molded ribbed panels with minimum swelling characteristics under conditions of high humidity.

It is still another object to provide molded ribbed panels which facilitate the installation of services when used as construction units.

It has now been discovered that these objects and others which will become apparent upon examination of the specification and attached drawings have been met by a panel comprising a skin section and a plurality of rib sections integrally located thereon, said panel being composed of fibrous particles bonded together, said fibrous particles in the skin section lying in planes substantially parallel to the plane of said skin section and the fibrous particles in the rib sections being oriented normal to the plane of said skin section.

Such a panel can be made by performing a mixture of fibrous particles and a curable bonding agent into a skin section with a plurality of ribs, applying a compression means perpendicularly to the plane of each rib section to orient and compress the fibrous particles therein substantially parallel to the plane of said rib section, applying a compression means substantially perpendicularly to the first compression means and to the plane of the skin section to compress the fibrous particles therein substantially parallel to the plane of said skin section and curing for a length of time and at a temperature sufficient to cure the mixture of fibrous particles and bonding agent.

Figure 2:
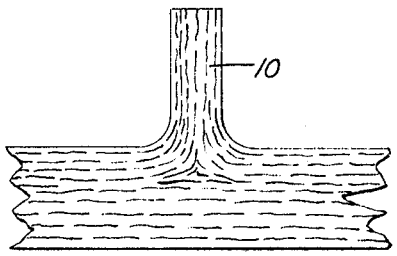
Figure 3:
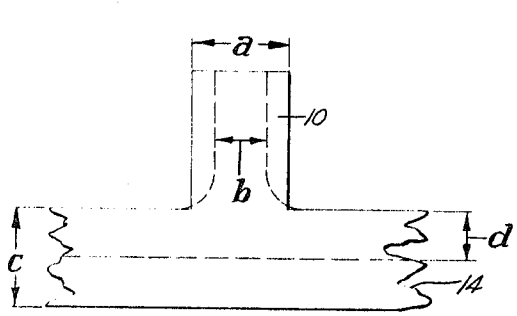
Figure 4:
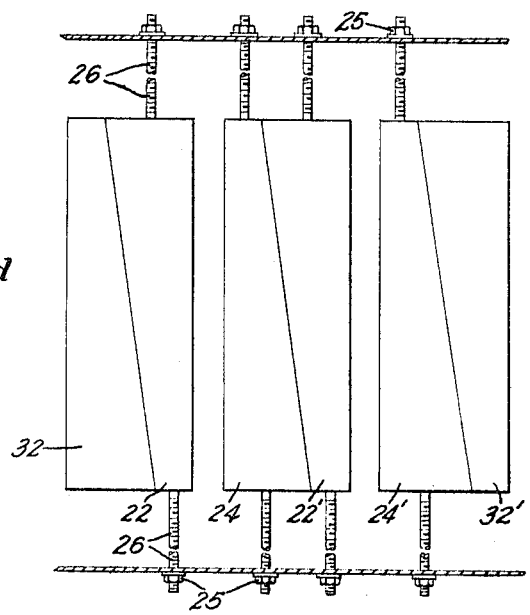
Figure 5:
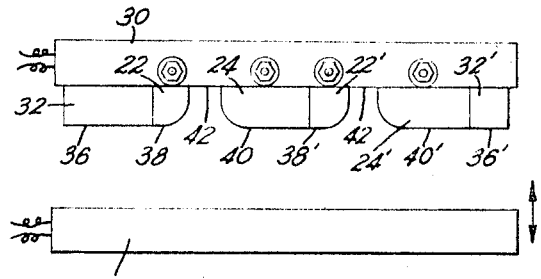
Figure 6:
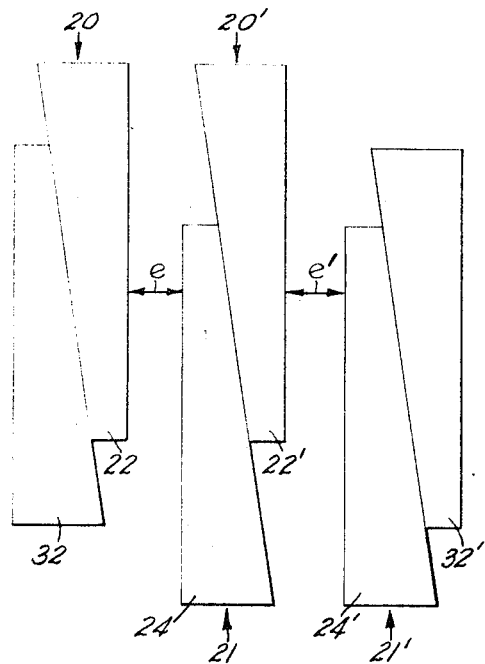
Figure 7:
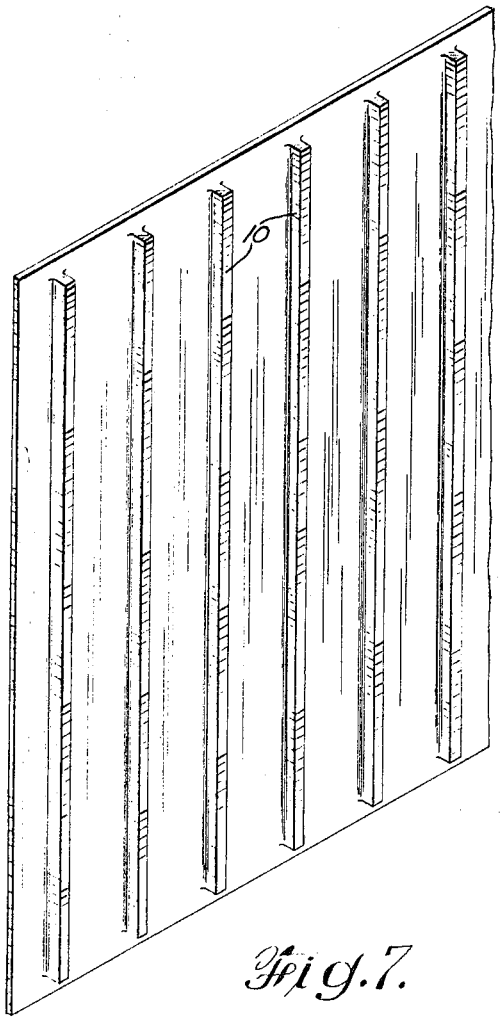
Figure 8:
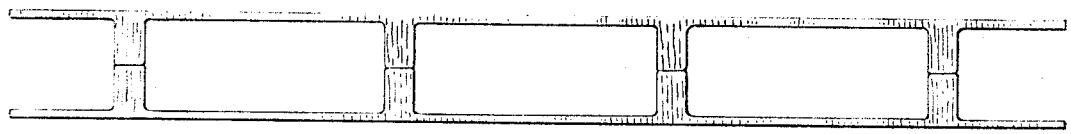

In the drawings:
FIGURE 1 is a vertical elevation, part being broken away, of the preformed ribbed panel showing fibrous particle orientation before treatment in accordance with the invention;
FIGURE 2 is a view similar to FIGURE 1 but showing fibrous particle orientation in the ribbed panel after treatment of the rib in accordance with the invention;
FIGURE 3 is a view similar to FIGURE 1 of a ribbed panel showing by broken lines the change in dimensions of the panel after treatment in accordance with the invention with particle orientation not being shown;
FIGURE 4 is a plan view of molding apparatus suitable for use in the method of the invention;
FIGURE 5 is a vertical elevation of the molding apparatus described in FIGURE 4 showing the upper and lower platens and rib molding sliding wedges as well as stationary wedges affixed to the upper platen;
FIGURE 6 is a plan view of the rib molding sliding wedges described in FIGURE 5;
FIGURE 7 is a perspective view of a molded ribbed panel and
FIGURE 8 is a vertical section of two molded ribbed panels joined to form a wall.

Referring now to the drawings in detail, a suitable apparatus for the practice of this invention is provided by a press such as that shown in FIGURE 5.

Such apparatus comprises an upper platen 30 and a lower platen 34 disposed to move vertically, both platens being adapted to being heated. One platen 34 is hydraulically actuated and when moved upwards against the stationary platen 30, can exert pressures of up to about 5,000 p.s.i. on materials placed between the platens 30 and 34.

Four sliding wedges 22, 22', 24 and 24' and two stationary wedges 32 and 32' are provided on the under surface 42 of the upper platen 30. The two stationary wedges 32 and 32' are adapted to cooperate with sliding wedges 22, 22', 24 and 24' in causing a diminution of the distances *e* and *e'* when the sliding wedges 22, 22', 24, 24' are moved inwards toward each other in the directions shown by the arrows 20, 20', 21 and 21'.

Correspondingly, the distances *e* and *e'* are increased as the sliding wedges 22, 22', 24 and 24' are moved outwards opposite to the directions shown by the arrows 20, 20', 21 and 21'. Both the stationary wedges 32 and 32' and the sliding wedges 22, 22', 24 and 24' are truncated right triangles but this shape is not critical.

The sliding wedges 22, 22', 24 and 24' are actuated in the inward or outward directions by turning nuts 25 attached to threaded rods 26 communicating with them. The device is not critical and so any conventional mechanical or hydraulic actuating means suitable for moving the sliding wedges can be used.

The wedge under surfaces 36, 36', 38, 38', 40 and 40' provide an upper platen surface adapted to serve in molding operations in conjunction with but on a lower plane than the under surfaces 42 and 42' of the upper platen 30.

With the above-described apparatus the vertical and horizontal compressive molding forces can be applied simultaneously or consecutively.

While the above-described apparatus is suitable for the practice of the present invention it is understood that other mechanical systems which provide similar horizontal and vertical compressive molding forces can also be used, if desired.

The first step in preparing the panels of this invention is the formation of the ribbed panel shown in FIGURE 1 which is preformed from suitable fibrous particles, previously treated with a sizing compound and curable bonding agent, by simply distributing a preweighed amount of said particle into a mold form where they pack by gravity but with each rib 10 integrally connected to the skin section 14. The fibrous particles 16 in the skin section 14 and rib sections 10 lie in substantially parallel planes in this preformed stage as demonstrated by the position of the particles 16 in FIGURE 1, being so oriented by the gravity feeding operation.

In one embodiment of this invention in the actual molding process, the preformed but uncured ribbed panel section is then placed intermediate the two horizontal, heated platens of the molding apparatus shown in FIGURE 5 with the rib structures carefully aligned intermediate the sliding wedges 22, 22', 24 and 24' while raising the lower platen. The sliding wedges 22, 22', 24 and 24' are then driven towards each other in the direction shown by the arrows 20, 20', 21 and 21', in FIGURE 6 resulting in a diminution of the distance e and e' between said wedges 22, 22', 24 and 24'.

As the distance e and e' is diminished, a compressive force is exerted horizontally on the rib 10 causing the fibrous particles to rotate so that they lie in a substantially normal relation to the force acting on them. During this operation, the heat generated from the heated platens causes the bonding agent to cure thus permanently fixing the fibrous particles in the newly oriented state.

The molding process is continued by moving the lower heated platen upwards under pressure while holding the upper heated platen fast, thus exerting a compressive force vertically on the skin section 14. In this step, the fibrous particles 16 being initially oriented in a substantially normal relation to the force acting on them do not undergo a reorientation being merely packed more tightly and cured by the heat generated from the heated platens in their original alignment, i.e., parallel to the plane of the skin section 14.

As a result of these two compressive operations, the dimensions of both the rib 10 and skin section 14 are reduced as shown in FIGURE 3 with the thickness of the rib 10 being compressed from $a$ to $b$ and the skin section 14 from $c$ to $d$.

This sequence of application of these compressive forces is not at all critical and can be varied if desired. Thus, for example, the invention can be practiced as readily by applying the vertical compressive first and then the horizontal compressive force or both may be applied simultaneously. Furthermore, the maximum compressive force used does not have to be applied at one time, but can be applied in steps in either horizontal or vertical or both directions. It can be readily seen that a plenitude of combinations of applications of compressive forces can be utilized in producing molded ribbed panels having a spectrum of oriented fiber systems.

Both compressive forces, that is, the horizontal force on the rib section 10 and the vertical force on the skin section 14 are maintained while the bonding agent is cured.

Where curing is achieved by heating, the heat source can be the heated platens themselves or if desired, supplied by radio frequency, ultrasonic or other heating techniques well known in the art. At the end of this period, the forces in both the rib 10 and the skin section 14 are released by withdrawing the sliding wedges 22, 22', 24 and 24', that is by moving them in reverse directions opposite to the arrows, 20, 20', 21 and 21' shown in FIGURE 6 and by lowering the platen. The ribbed panel is then removed from the hydraulic press and is ready for use as a building member, having ribs with improved tensile, impact and shear strengths.

It will be readily understood by those skilled in the art that by modifying a molding press by installing a plurality of sliding wedges on the inner, lower face 42 of the upper platen 30 a building panel as shown in FIGURE 7 can be molded having a plurality of ribs thereon. Notches can be cut after the molding operation is complete or imparted to the ribs 10 during the molding operation. By bonding two of the panels shown in FIGURE 7 so that their respective skin sections 14 form outer walls and the respective ribs 10 are contiguous, a structural unit can be fabricated as shown in FIGURE 8.

If the ribs are notched the structure shown in FIGURE 7 is particularly adaptable to the construction of walls in frame dwellings, since electrical wiring, junction boxes, outlets and other services such as plumbing, heating and air conditioning ducts can be installed thereon and then bonded with another like unit to form a building wall unit as shown in FIGURE 8, containing these services installed therein. The advantage of such a system in the erection of prefabricated dwellings is obvious and unique in that the exact dimensions of the wall panel as a whole and the location of the services within can be shifted and changed to meet the exacting and precise requirements of local building codes and the design of each particular house.

Returning now to the variables involved in the molding operation itself, the molding temperatures and time first of all are not narrowly critical with a wide range being acceptable. The nature of the curable bonding agent used will determine the preferred ranges to a large extent. Thus, for example, with a phenol-aldehyde condensation product as little as 5 minutes and as long as 45 minutes can be employed at about 250° F. to 450° F. It is particularly preferred to use a range of about 300 to 350° F. for about 5 to 20 minutes. When urea-formaldehyde resins are used, a range of about 250° F. to 350° F. up to 30 minutes is preferred.

The pressures used to compress both the ribs 10 and skin section 14 are also not narrowly critical. A range of about 200 to 500 p.s.i., can be used with the former and about 225 to 750 p.s.i. for the latter. A preferred range for the former is about 200 to 400 p.s.i. and for the latter about 250 to 500 p.s.i.

The compression ratio used in molding the panels of this invention, that is, the ratio of the original thickness to the final, compressed thickness measurements, is not critical but is determined by the nature of the fibrous particles employed and other materials used therewith such as fillers, pigments, fungicides, flame retardants and the like. Thus compression ratios ranging from about 2:1 to 30:1 can be employed with about 5:1 being a preferred ratio. This ratio is based on the original bulk density of the particles, and the desired density of the finished product.

Although the horizontal compression means for the molding of the ribs 10 has been described as sliding wedges, it is understood that other mechanical devices can be employed to achieve a like compressive force. Any commercially available hydraulic press can be used to provide the vertical compression means for the molding of the skin section 14. It is preferred that such a press can also be equipped with an efficient heating means for curing the bonding agent and temperature controlling means for observing and controlling the heating process as well.

The molding compositions used to prepare the panels of this invention comprise in general, about 100 parts of fibrous particles, about 2 to 15 parts of a heat curable bonding agent, about 0.25 to 1.5 parts of a sizing compound and about 10 to 15 parts of water (all parts by weight). If desired, flame retardants such as monobasic ammonium phosphate, ammonium sulfamate and the like; extenders such as asphalt, wheat flour or casein derivatives, and rot and fungus resistant agent ssuch as sodium pentachlorophenate or cresols can also be added.

The fibrous particles contemplated within the purview of this invention can be chips, fibers, strands or other particles of (a) cellulosic materials such as wood from oak, elm, spruce, pine, ash, chestnut, beech, poplar, fir, hemlock, birch, maple, or aspen trees, or fibers from bagasse, corn, beets, kelp or grass; (b) noncellulosic materials such as asbestos, rock wool, glass fibers and the like. The choice can be determined by consideration of such factors as the density, mechanical strength, exposure conditions availability and cost of the panel to be fabricated.

The curable bonding agent to be used for binding the fibrous particles can be any of a wide variety of resins well known in the art. A partial listing includes urea-formaldehyde resins, phenol-aldehyde condensation products, melamine resins, alkyl resins, epoxy resins and the like, as well as mixtures of the above. If desired, even natural resins found in some species of wood can be used without adding synthetic resins, as well as inorganic cements. The binder, the particle type, or particle configuration are not critical to the practice of this invention.

Preferred urea-formaldehyde resins can be obtained by known methods by reacting 1 mole of urea with 1.5 to 3.0 moles of formaldehyde. An example of such a bonding agent is available from American Cyanamid, under the tradename Urac Resin 186 as a syrup containing 59% to 61% solids.

The phenol-aldehyde condensation products which can be used in this invention are divided into two classes, resoles and novolaks. Resole resins are produced by the condensation of phenols and aldehydes under alkaline conditions. Resoles differ from novolaks in that polynuclear methylol-substituted phenols are formed as intermediates in resoles. A resole produced by the condensation of phenol with formaldehyde most likely proceeds through an intermediate having the following illustrated type structure:

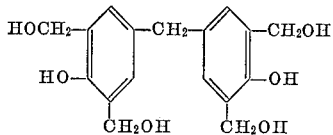

In a typical synthesis, resoles are prepared by heating one mol of phenol with 1.5 moles of formaldehyde under alkaline conditions.

The resole resins are prepared by the condensation of phenol with an aldehyde, or, more generally, by the reaction of a phenolic compound, having two or three reactive aromatic ring hydrogen positions, with an aldehyde or aldehyde-liberating compound capable of undergoing phenol-aldehyde condensation. Illustrative of phenolic compounds are phenol, cresol, xylenol, ethylphenol, butylphenol, isopropylmethoxyphenyl, chlorophenol, resorcinol, hydroquinone, naphthol, 2,2 - bis(p - hydroxyphenyl)propane, and the like. Illustrative of aldehydes are formaldehyde, acetaldehyde, acrolein, crotonaldehyde, furfural, and the like. Illustrative of aldehyde-liberating compounds are for example, paraformaldehyde, formalin and 1,3,5-trioxane. Ketones such as acetone are also capable of condensing with the phenolic compounds, as are methylene engendering agents such as hexamethylenetetramine.

The condensation of phenolic compound and aldehyde is conducted in the presence of alkaline reagents such as sodium carbonate, sodium acetate, sodium hydroxide, ammonium hydroxide, and the like. When the condensation reaction is completed, if desired, the water and other volatile materials can be removed by distillation, and the catalyst neutralized.

The novolak resins are prepared in a manner similar to that used to prepare the resole resins. The distinguishing exception in this preparation is, however, that the reaction is conducted in an acidic media, instead of an alkaline media as is the case with the resoles. When less than six moles of aldehyde are used per seven moles of phenol, the products are permanently fusible and soluble. These are the novolak resins. The novolaks have a different structure than the resoles as is illustrated by the novolak condensation products of phenol with formaldehyde:

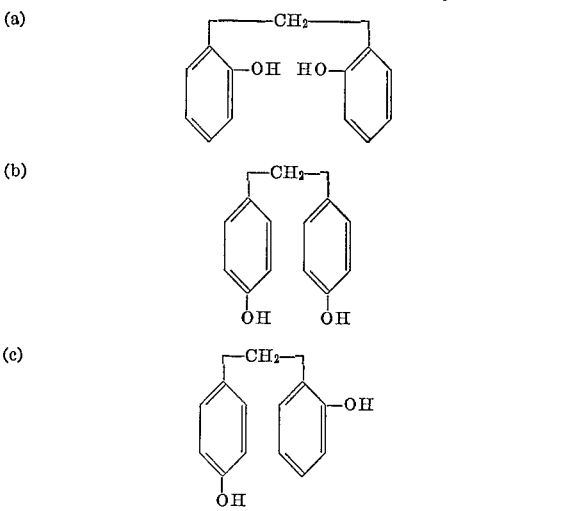

The novolaks can be further reacted with formaldehyde or with a methylol yielding compound such as hexamethylene tetramine, to a state of cure which is similar in the nature to the curing pattern of the resoles.

In a typical synthesis novolaks are prepared by heating one mole of phenol with 0.5 mole of an aldehyde under acidic conditions. The temperature at which the reaction is conducted is generally from about 25° C. to about 175° C.

The reactants which can be used in the preparation of the novolaks are the same as those used in the preparation of the resoles which are described and listed above.

While, as previously stated, both the resole resins and the novolak resins can be employed in the composition of the present invention, it is preferred to use the resole resins or combinations of resoles and novolaks.

The most suitable resole resins are those which are insoluble in water, readily soluble in conventional organic solvents such as methyl ethyl ketone, acetone, methanol, ethanol and the like. Resole resins having a particularly desirable combination of properties are those which have an average molecular weight in the range between about three hundred fifty and six hundred. It is believed that these resole resins contain an average of at least one free methylol group per aromatic nucleus.

The melamine resins, polymethyl ethers of polymethylol melamines, are well known in the art as are methods for preparing them. Polymethylol melamines can be prepared by reacting one mole of melamine with at least two moles of formaldehyde. The fully methylolated melamine, such as hexamethylol melamine, can be prepared by reacting at least six moles of formaldehyde with one mole of melamine. In order to obtain the desired methyl ether, the polymethylol melamines thus produced are caused to react with the requisite amount of methanol. The completely etherified hexamethylol melamine, hexamethoxymethylmelamine, is the preferred melamine, although those with a lesser degree of etherification can also be used.

The preparation and evaluation of molded ribbed panels is illustrated by the following examples. All parts and percentages are by weight unless otherwise specified.

EXAMPLE 1

A mixture of 20 pounds of mixed hemlock birch and spruce splinter particles having an average length of ½ inch and an average thickness of 1/64 inch, and a width of 1/8 inch, and 1.0 pound of a one step, heat curable powdered phenol-formaldehyde resin was blended in a mechanical mortar type mixer for about 15 minutes during which period 0.33 pound of a 46% solids, aqueous paraffin wax emulsion was sprayed on the tumbling mixture. About 2.06 pounds of the resultant mixture were laid down into a bottomless rectangular mold box, having inside dimensions of 16" x 14" and resting on an aluminum plate such that a mat about 1.5" high was formed. The box was removed leaving the rectangular mat intact on the aluminum plate. Two ribs were then molded on top of this mat on 8" centers, each 3" wide, 1.25" high, and 14" long with a second form. Each rib portion was formed with 0.37 pound of the splinter mixture.

The aluminum plate containing the preformed mat and ribs thereon was placed on the bottom platen of a bottom acting platen hydraulic press. The sliding wedges shown in FIGURE 6 were mounted on the underside of the top platen 30 as shown in FIGURE 5. The platens were heated to about 320° F. and the press slowly closed with the ribs positioned between the wedges. As the press was closed, the wedges were moved towards each other in the directions indicated by the arrows 20, 20', 21 and 21' in FIGURE 6 by means of turning nuts on threaded rods attached to the wedges. The pressure of about 200 p.s.i. generated by the horizontal movement of the wedges on the ribs, compressed the ribs from the dimensions, 3" wide x 1.25" deep x 14" long, to the dimensions, 0.75" wide x 1.25" deep x 14" long and reoriented the splinter particle in a direction normal to the applied force. The bottom platen 34 was raised further upward pressing on the mat section and generating a pressure of about 300 p.s.i. The thickness of the mat section was compressed by this pressure from 1.25" to 0.375". The press was left under these conditions of pressure and temperature for about 20 minutes. The press was then opened and the cured panel removed.

The operation was repeated 5 times and the panels obtained thereby cut into 12 T-shaped sections, 2" long x 2" wide, pairs of which were bonded together with a liquid epoxy resin, having an epoxide equivalent of about 185–200, containing 8 parts per hundred of diethylenetriamine through their rib sections to form 6 I sections later used for tensile tests. The agent used for this bonding operation is not critical, but it should produce an adhesive bond having a tensile strength greater than that of the molded fibrous particle adherends. Suitable materials which can be employed for the bonding step include, in addition to epoxy resins, animal glues, fish glues, protein glues as for example, casein, zein, soybean or blood albumin, phenol-formaldehyde condensation products such as the resoles and novolaks, resorcinol-formaldehyde resins, furfural resins, and the like. The glue itself is not critical either. Glue lines between 1 and 10 mils and higher can be used.

EXAMPLE 2

The procedure described in Example 1 was followed with the exception that the sliding wedges were replaced by solid, nonmoving bars such that the panels were molded by vertical compression means only. Since there was no horizontal molding force exerted on the ribs there was no orientation of splinter particles in the rib sections. The splinter particles in both the skin and rib sections of the molded panels thus produced were in the original alignment of the preformed panels, that is, parallel to plane of the skin as shown in FIGURE 1.

The test specimens were pulled apart in a Tinius Olsen Tensile Test machine with the jaws holding the skin sections of the specimens. No breaks occurred at the glue line. The data thus obtained, showed that the specimens from Example 1 had an average breaking load of 140 pounds in contrast to the specimens of Example 2 which showed an average breaking load of 66 pounds. These experiments thus demonstrated that the orientation of the splinter particles in the rib sections afforded panels having more than twice the tensile strength of unoriented panels.

EXAMPLE 3

Swelling measurements show that when T panels are made by vertical compression of both the rib and skin sections as described in Example 2 and then joined through the ribs into I panels, there can be a thickness swell under conditions of high humidity of up to about 15% due to the unoriented fibrous particles in the rib sections. On the other hand, panels made according to the teachings of this invention as described in Example 1 show a thickness swell of only about 3% since the fibrous particles are aligned and oriented in the rib direction normal to the skin sections. The difference in thickness swell characteristics are highly significant in the construction of walls for frame dwellings.

What is claimed is:
1. A method of making a panel which comprises the steps of:
   (a) preforming a mixture of fibrous particles and a curable bonding agent into a skin section with a plurality of ribs;
   (b) applying compression means perpendicularly to the planes of both the rib sections and skin section to compress the fibrous particles in the skin section parallel to the plane of said skin section and to orient and compress the fibrous particles in the rib sections substantially normal to the plane of said skin section; and
   (c) curing for a length of time and at a temperature sufficient to cure the mixture of fibrous particles and bonding agent.

2. The method claimed in claim 1 wherein the fibrous particles are cellulosic fibers and the bonding agent is a one step, heat-curable, phenol-formaldehyde resin.

3. The method claimed in claim 1 wherein the fibrous particles are wood particles and the bonding agent is a heat curable, urea-formaldehyde resin.

4. The method claimed in claim 1 wherein the compression ratio of the compression means is from about 4:1 to 12:1.

5. The method claimed in claim 1 wherein the curing time was about 5 to 20 minutes and the curing temperature was about 250° F. to 450° F.

6. The method claimed in claim 1 wherein the compression means applied perpendicularly to the rib sections was about 200 to 500 p.s.i. and the compression means applied perpendicularly to the skin section was about 200 to 500 p.s.i.

7. A method of making a panel which comprises the steps of:
   (a) preforming a mixture of fibrous particles and a heat curable bonding agent into a skin section with a plurality of rib sections;
   (b) applying a first compression means perpendicularly to the plane of each rib section to orient and compress the fibrous particles therein substantially parallel to the plane of said rib sections;
   (c) applying a second compression means after and substantially perpendicularly to the first compression means and to the plane of the skin section to compress the fibrous particles therein substantially parallel to the plane of said skin sections; and
   (d) curing for a length of time and at a temperature sufficient to cure the mixture of fibrous particles and bonding agent.

8. A method of making a panel which comprises the steps of:
   (a) preforming a mixture of fibrous particles and a curable bonding agent into a skin section with a plurality of ribs;
(b) applying a first compression means perpendicularly to the plane of the skin section to compress the fibrous particles therein substantially parallel to the plane of said skin section;
(c) applying a second compression means after and substantially perpendicularly to the first compression means and to the planes of the rib sections to orient and compress the fibrous particles therein substantially parallel to the planes of said rib sections; and
(d) curing for a length of time and at a temperature sufficient to cure the mixture of fibrous particles and bonding agent.

References Cited

UNITED STATES PATENTS

| | | | |
|---|---|---|---|
| 1,921,524 | 8/1933 | Hodges | 156—264 XR |
| 1,937,680 | 12/1933 | Billings | 156—264 XR |
| 2,528,049 | 10/1950 | Gonda | 161—69 XR |
| 2,715,598 | 8/1955 | Rees et al. | 161—122 |
| 2,960,423 | 11/1960 | Kreibaum | 161—162 XR |
| 839,680 | 12/1906 | Voigt | 144—320 |
| 1,337,254 | 4/1920 | Muench | 161—123 |
| 2,475,375 | 7/1949 | Clark | 264—108 |
| 3,231,455 | 1/1966 | Campbell et al. | 161—124 |
| 3,260,635 | 7/1966 | Page et al. | 156—40 |

FOREIGN PATENTS

| | | |
|---|---|---|
| 77,018 | 1/1955 | Netherlands. |
| 550,166 | 1/1954 | Canada. |

ROBERT F. BURNETT, *Primary Examiner.*

W. A. POWELL, *Assistant Examiner.*

U.S. Cl. X.R.

52—309; 144—320; 156—245, 299; 161—59, 122, 123, 170; 264—120, 122